United States Patent
Vilcaez

(10) Patent No.: US 11,840,470 B2
(45) Date of Patent: Dec. 12, 2023

(54) SYSTEM AND METHOD OF REMOVING OIL AND TOXIC METALS FROM PETROLEUM PRODUCED WATER

(71) Applicant: The Board of Regents for the Oklahoma Agricultural and Mechanical Colleges, Stillwater, OK (US)

(72) Inventor: Javier Vilcaez, Stillwater, OK (US)

(73) Assignee: The BOARD OF REGENTS FOR THE OKLAHOMA AGRICULTURAL AND MECHANICAL COLLEGES, Stillwater, OK (US)

( * ) Notice: Subject to any disclaimer, the term of this patent is extended or adjusted under 35 U.S.C. 154(b) by 142 days.

(21) Appl. No.: 17/526,734

(22) Filed: Nov. 15, 2021

(65) Prior Publication Data

US 2022/0153620 A1   May 19, 2022

Related U.S. Application Data

(60) Provisional application No. 63/114,115, filed on Nov. 16, 2020.

(51) Int. Cl.
*C02F 9/00* (2023.01)
*B01D 21/01* (2006.01)
(Continued)

(52) U.S. Cl.
CPC .............. *C02F 9/00* (2013.01); *B01D 21/01* (2013.01); *C02F 1/281* (2013.01); *C02F 1/5236* (2013.01);
(Continued)

(58) Field of Classification Search
None
See application file for complete search history.

(56) References Cited

U.S. PATENT DOCUMENTS

| | | | |
|---|---|---|---|
| 7,520,993 B1 * | 4/2009 | Laraway | C02F 9/00 |
| | | | 210/639 |
| 2014/0069821 A1 * | 3/2014 | Marcin | C25B 15/00 |
| | | | 204/240 |

(Continued)

*Primary Examiner* — Clare M Perrin
(74) *Attorney, Agent, or Firm* — Fellers, Snider, Blankenship, Bailey & Tippens, P.C.; Terry L. Watt

(57) ABSTRACT

Taught herein is a two stage process for removing dissolved and emulsified oil from produced water (PW) from, for example, a hydrocarbon well. The first stage involves microbiological stimulation of indigenous oil degrading methanogenic microbial communities that are adapted to high salinity conditions preferably by supplying carbon dioxide and protein-rich matter (isolated soy protein) under controlled pH conditions. The second stage removes toxic metals using filters made of compressed powdered dolomite of uniform grain size. Increased levels of toxic metals removal are achieved by filtrating PW previously treated for oil. To further increase the removal efficiency of the dolomite filter, calcium and magnesium is removed from PW by the addition of lime and soda ash in a sedimentation tank, and guar gum is supplied to PW to enable the trapping of toxic metals by guar gum in small pore throats of the dolomite filter.

11 Claims, 4 Drawing Sheets

(51) Int. Cl.
*C02F 1/28* (2023.01)
*C02F 1/52* (2023.01)
*C02F 1/56* (2023.01)
*C02F 1/66* (2023.01)
*E21B 21/06* (2006.01)
*C02F 3/28* (2023.01)
*C02F 101/10* (2006.01)
*C02F 101/32* (2006.01)
*C02F 103/10* (2006.01)
*E21B 43/34* (2006.01)
*C02F 1/68* (2023.01)

(52) U.S. Cl.
CPC .............. *C02F 1/5245* (2013.01); *C02F 1/56* (2013.01); *C02F 1/66* (2013.01); *E21B 21/068* (2013.01); *C02F 1/68* (2013.01); *C02F 3/28* (2013.01); *C02F 2101/10* (2013.01); *C02F 2101/32* (2013.01); *C02F 2103/10* (2013.01); *C02F 2305/06* (2013.01); *E21B 43/34* (2013.01)

(56) References Cited

U.S. PATENT DOCUMENTS

2014/0124453 A1* 5/2014 Presutti .................... C02F 1/72
                                                    210/721
2016/0200600 A1* 7/2016 Duggirala ............. C02F 11/148
                                                    252/181

* cited by examiner

SYSTEM AND METHOD OF REMOVING OIL AND TOXIC METALS FROM PETROLEUM PRODUCED WATER

CROSS REFERENCE TO RELATED APPLICATIONS

This application claims the benefit of U.S. Provisional Patent Application Ser. No. 63/114,115 filed on Nov. 16, 2020, and incorporates said provisional application by reference into this document as if fully set out at this point.

TECHNICAL FIELD

The instant invention relates generally to waste water treatment and, more particularly, to treatment of wastewater produced by oil and gas production.

BACKGROUND

The production of conventional and unconventional oil and gas resources is accompanied by the production of large volumes of produced water (PW). PW contains high concentrations of total dissolved solids (TDS) and oil. TDS of PW includes high concentrations of toxic metals (e.g., Ba, Sr, Cd, Cr, and As). Oil includes dissolved and emulsified oil mostly composed of n-alkanes. Concentrations of n-alkanes and toxic metals in PW is orders magnitude higher than in conventional wastewater. A combination of high concentrations of n-alkanes and toxic metals does not only pose a risk to human health, but it also hinders the reutilization of PW as a drilling or hydraulic fracturing fluids, the integration of PW into industrial and agricultural uses, and/or the safe disposal of PW.

On the one hand, removal of organic contaminants from conventional (e.g., municipal and industrial) wastewater is commonly done through the application of microbiological and physical treatment methods. However, microbiological treatment methods (e.g., activated aerobic or anaerobic sludge) are not suitable to treat PW for dissolved and emulsified oil (mostly n-alkanes). The high salinity (mostly NaCl) of PW inhibits the activity of activated sludge microorganisms. Therefore, the use of conventional activated sludge treatment plants to treat PW for dissolved and emulsified oil requires dilution with freshwater to reduce the salinity of PW below threshold limits, significantly reducing the capacity of conventional wastewater treatment plants to treat large volumes of PW. Conventional physical treatment methods such as filtration is the preferred method by oil industry to treat PW for dissolved and emulsified oil, see for instance U.S. Pat. No. 7,520,993 B1. However, the clogging of filters by emulsified oil and large molecule hydrocarbons such as n-alkanes leads to severe fouling problems, significantly reducing the service life of filtration media.

On the other hand, removal of toxic metals from conventional wastewater is commonly done through the application of physicochemical treatment methods that rely on sorption, ion exchange, and precipitation reactions. However, the efficiency of these methods is significantly impacted by the presence of high concentrations of TDS and dissolved and emulsified oil in PW. High concentrations of TDS and dissolved and emulsified oil in PW, hinders the occurrence of metal removal reactions and causes fouling of separation equipment such as filters, significantly reducing the efficiency of toxic metals removal by physicochemical treatment methods.

For produced water to be reutilized as a drilling or hydraulic fracturing fluid, to be integrated into industrial and agricultural uses, and/or to prevent the contamination of drinking water sources, new economic treatment methods need to be developed to remove n-alkanes and toxic metals from PW. These two groups of contaminants hinder the utilization of conventional wastewater treatment plants to remove salinity as well other organic and inorganic contaminants which are present at much higher concentrations in PW than in conventional wastewater. Salinity (mostly NaCl) can be removed from PW at an economic cost using conventional seawater desalination technologies such as membrane distillation if PW is previously treated for dissolved and emulsified oil.

Thus, what is needed is a method of treating produced water containing high concentrations of total dissolved solids and oil which does not suffer from the disadvantage of prior art approaches.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

An embodiment is designed to remove dissolved and emulsified oil (mostly n-alkanes) and toxic metals from petroleum produced water (PW) consists of a two-stage treatment process. The first stage is to remove dissolved and emulsified oil from PW through the microbiological stimulation of indigenous oil degrading methanogenic microbial communities that are adapted to high salinity conditions. Here, stimulation is achieved by the combined supply of carbon dioxide and protein-rich matter (isolated soy protein is one example) under controlled pH conditions.

The second stage is to remove toxic metals using filters made of compressed powdered dolomite of uniform grain size. Here, increased levels of toxic metals removal are achieved by filtrating PW previously treated for oil. To further increase the removal efficiency of the dolomite filter, calcium and magnesium is removed from PW by the addition of lime and soda ash in a sedimentation tank, and guar gum is supplied to PW to enable the trapping of toxic metals by guar gum in small pore throats of the dolomite filter.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

FIG. 2A: Production of hydrogen (H2), methane (CH4) and carbon dioxide (CO2) in the headspace of a batch reactor supplied with oil (8 mL/L), isolated soy protein (2 g/L), and CO2 as sodium bicarbonate (10 g/L). FIG. 2B: Gas chromatography analysis of raw and biodegraded oil after incubation for 100 days.

(FIG. 3A) and 25° C. (FIG. 3B). Initial concentration of dissolved and emulsified oil in PW in FIG. 3A was 1 mL-oil/L-PW and in FIG. 3B was 0.8 mL-oil/L-PW.

FIG. 4A contains an illustration of breakthrough curves of 100 mg/L of Ba through dolomite filters (1-inch diameter and 3-inch length) with and without the addition of guar gum (GG) and FIG. 4B contains an example of a curve that represents pressure buildup at the inlet of the dolomite filtration column.

Figure 1:
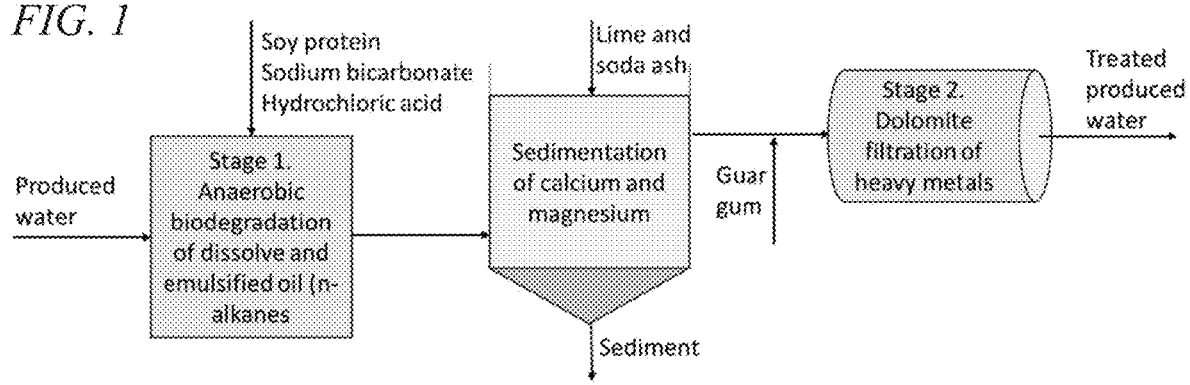
FIG. 1 shows a schematic representation of an embodiment of the invention to remove dissolve and emulsified oil (mostly n-alkanes) and toxic metals from PW at an economic cost. The invention consists of a two-stage treatment process.

The invention will be described in connection with its preferred embodiments. However, to the extent that the following detailed description is specific to a particular embodiment or a particular use of the invention, this is intended to be illustrative only and is not construed as limiting the invention's scope. On the contrary, it is intended to cover all alternatives, modifications, and equivalents included within the invention's spirit and scope, as defined by the appended claims.

DETAILED DESCRIPTION

While this invention is susceptible of embodiment in many different forms, there is shown in the drawings, and will be described hereinafter in detail, some specific embodiments of the instant invention. It should be understood, however, that the present disclosure is to be considered an exemplification of the principles of the invention and is not intended to limit the invention to the specific embodiments or algorithms so described.

FIG. 1 shows a schematic representation of the invention to remove dissolve and emulsified oil (mostly n-alkanes) and toxic metals from PW at an economic cost. The invention consists of a two-stage treatment process. The first stage is to remove dissolved and emulsified oil from PW through a new microbiological stimulation method that relies on the activity of indigenous oil degrading methanogenic microbial communities that are adapted to high salinity conditions. Retention time of PW in the first stage to remove typical concentrations of dissolved and emulsified oil in PW (0.5-1.5 ml-oil/L-PW) is 1-2 weeks. The optimum retention time should be determined by monitoring the oil concentration in the effluent PW. The enclosed anaerobic tank reactor can be operated under batch or continuous conditions.

Continuing with the embodiment of FIG. 1, after a period of time a second stage is initiated. The second stage is designed to remove toxic metals from PW using a dolomite filtration method that relies on the sorption capacity of dolomite for metals. In the present invention, an enhanced removal of toxic metals from PW by dolomite filtration is attained due to the removal of dissolved and emulsified oil which inhibits toxic metal sorption reactions in the dolomite filter. To further enhance the removal of toxic metals by dolomite filtration, calcium and magnesium which compete with metals for hydration (sorption) sites of dolomite are removed from PW by the addition of lime and soda ash in sedimentation tanks, and guar gum is supplied to PW at the inlet of the dolomite filter to promote the trapping of toxic metals by guar gum in small pore throats of the dolomite filter.

Microbiological Stimulation.

Stimulation of methanogenic oil biodegradation is done in enclosed PW storage tanks to preserve the anaerobic condition of PW. The stimulation method consists of the combined supply of protein-rich matter, a carbon dioxide source, preferably in the form of sodium bicarbonate, and an acid source such as hydrochloric acid.

A principal factor impeding methanogenic biodegradation of dissolved and emulsified oil in oil and natural gas reservoirs is the lack of nutritional resources. In general, PW from oil and natural gas reservoirs contain an ample supply of carbon sources but are usually poor in nitrogen, phosphorus, and trace metal sources. In the present invention, isolated soy protein (protein-rich matter) is added as a source of depleted nutritional resources (nitrogen, phosphorus, and trace metals) to PW. Isolated soy protein, which is the cheapest type of protein-rich matter in the world can be used as substitute for yeast extract, which is the most widely used protein-rich matter employed to stimulate the activity of pure and mixed culture of microbes at the lab-scale.

Figure 2A:
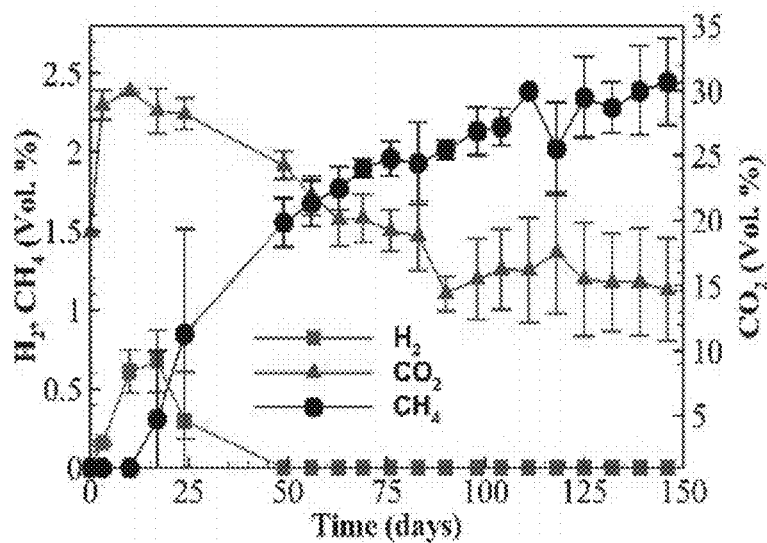
FIGS. 2A and 2B show experimental results obtained using PW and oil collected from an actual oil reservoir.

FIG. 2A shows representative experimental results obtained using PW and oil collected from an actual oil reservoir. In these experiments 8 mL of crude oil was supplied to 1 L of PW. The stimulating effect of carbon dioxide and isolated soy protein is reflected by the rapid increase in hydrogen concentration, followed by methane production. The biogenic production of methane is fast during the initial stages of the reaction due to the conversion of carbohydrates present in the supplied isolated soy protein. Methane production does not cease as one might expect if the only source of carbon and hydrogen was the supplied soy protein. In contrast, methane production continues, suggesting that methane is eventually formed from the biodegradation of n-alkanes in the supplied crude oil.

Figure 2B:
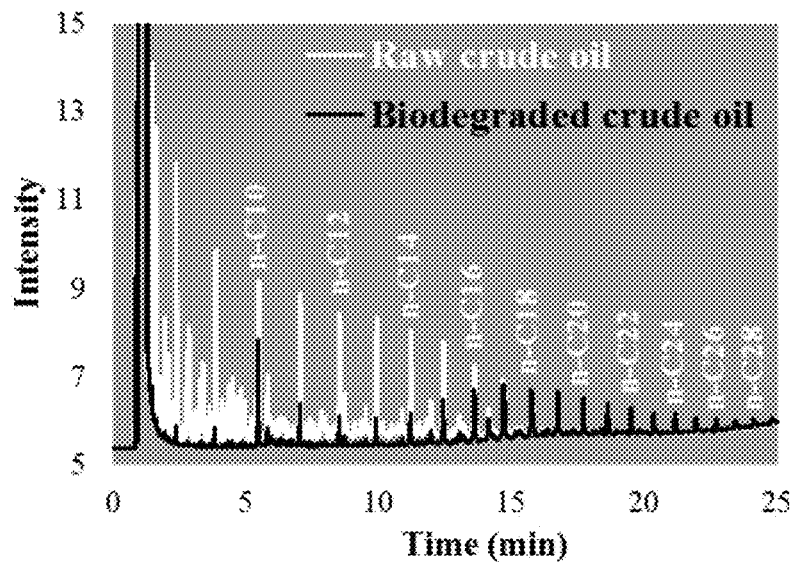
Figure 3A:
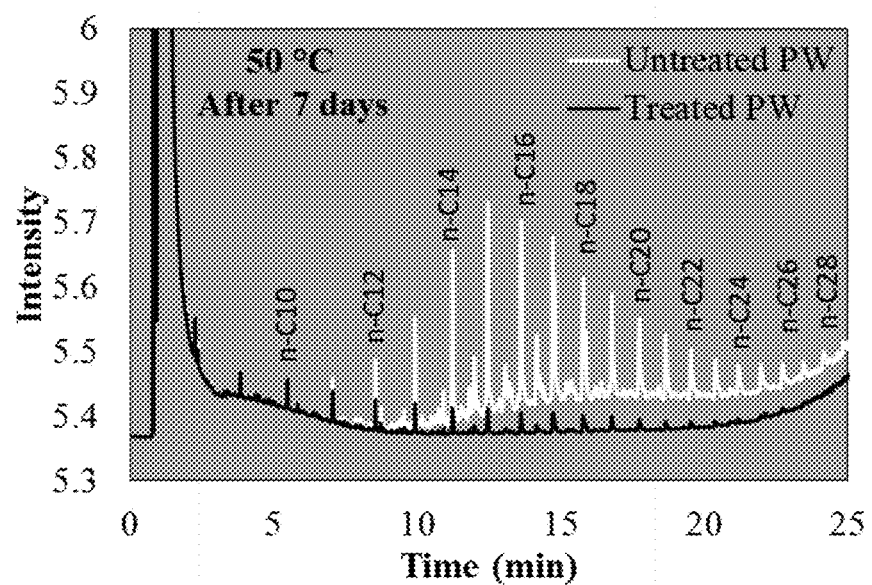
FIGS. 3A and 3B contain an illustration of a gas chromatography analysis of dissolved and emulsified oil in untreated PW (control) and treated PW by the invented stimulation method after incubation for 7 days at 50° C.
Figure 3B:
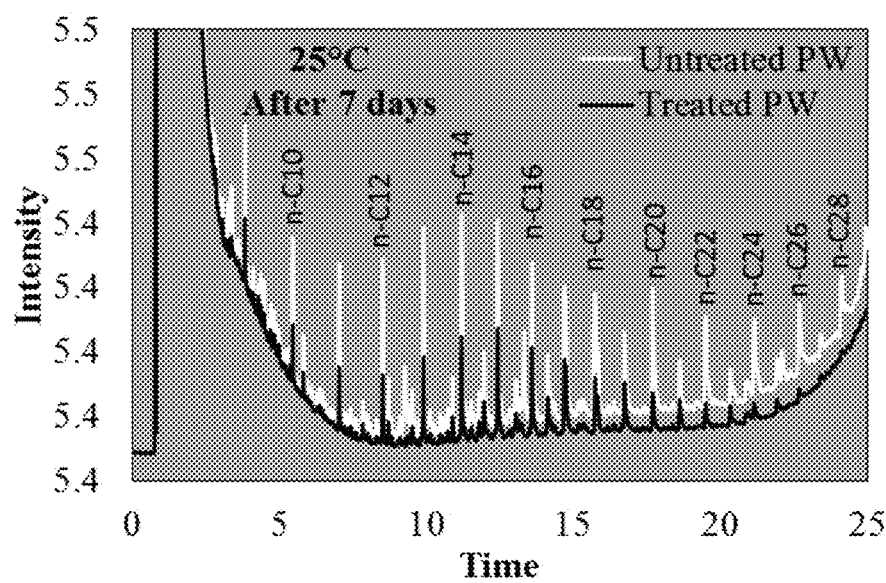

FIG. 2B compares chromatograms of the supplied crude oil and the biodegraded crude oil remaining in the batch reactor. The heights of first strong peaks in the chromatogram of the supplied crude oil are light n-alkanes. These peaks are not found in the biodegraded crude oil chromatogram, indicating that the combined supply of carbon dioxide and protein-rich matter stimulates crude oil biodegradation and does not merely act as a carbon source.

Methanogenesis occurs mostly via the reduction pathway of carbon dioxide (Eq. 1) and acetate fermentation (Eq. 2)

with hydrogen and acetate produced from the fermentation of dissolved and emulsified oil (C16H34) (Eq. 3).

$$68H_2 + 17CO_2 \rightarrow 17CH_4 + 34H_2O \quad (1)$$

$$32CH_3COO^- + 32H^+ \rightarrow 32CH_4 + 32CO_2 \quad (2)$$

$$4C_{16}H_{34} + 64H_2O \rightarrow 32CH_3COO^- 32H^+ + 68H_2 \quad (3)$$

The thermodynamic bottleneck of the fermentative biodegradation of oil (Eq. 3) is the excess partial pressure of hydrogen which inhibits the fermentative biodegradation of oil. Therefore, in the present invention sodium bicarbonate is added as source of carbon dioxide to convert the hydrogen produced from the biodegradation of oil to methane gas such that hydrogen partial pressure remains below thermodynamic threshold levels preventing the inhibition of the fermentative biodegradation of dissolved and emulsified oil. A decrease in the concentration of carbon dioxide in the head space of the batch reactor is concomitant with a decrease of the concentration of hydrogen and an increase of the concentration of methane (FIG. 2A), proving that the supply of carbon dioxide effectively serves to reduce the partial pressure of hydrogen. The combined supply of protein-rich matter and carbon dioxide in the form of sodium bicarbonate has a synergistic stimulating effect on the biodegradation of oil that is superior to the stimulating effect of supplying yeast extract and carbohydrates.

The addition of sodium bicarbonate as source of carbon dioxide results in an increase of pH of PW. Therefore, in the present invention an acid source, preferably hydrochloric acid, is added to counterbalance the alkalization effect of sodium bicarbonate and to reduce the pH of PW to acidic levels (e.g., a pH of 4-5) where the activity of fermentative microbial communities is highest. That being said, a pH of 4.5 is often a good choice. The addition of hydrochloric acid results in fast increase in the concentration of carbon dioxide in the headspace of the batch reactor during the initial stages of the reaction (FIG. 2A). It is noteworthy that in the present invention, carbon dioxide captured from power plants or other industrial sources (e.g., oil refineries, gas-processing plants, cement plants, iron, and steel plants, etc.) could be used instead of carbon dioxide as sodium bicarbonate. This would reduce the need to add acid to modify the pH of PW to acidic levels.

Dolomite Filtration.

Filtration of toxic metals is done using filters made of compressed powdered dolomite of uniform grain size. Prior to its injection into the dolomite filter, PW is pretreated for calcium and magnesium in a sedimentation tank using lime as soda ash as precipitating agents. Guar gum is supplied to PW pretreated for calcium and magnesium at the inlet of the dolomite filter to enhance the removal of toxic metals from PW.

The procedure to make dolomite filters includes powdering and sieving of dolomite to obtain uniform grain sizes, mixing of dolomite of uniform grain size with deionized water, and compaction and compression of the resulting aggregate in a mold at a constant pressure 5 MPa for 1 hour.

Figure 4A:
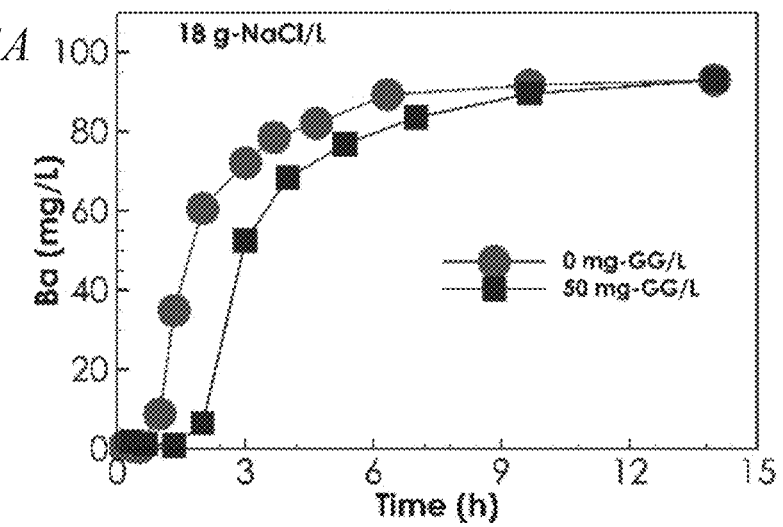
FIGS. 4A and 4B.
Figure 4B:
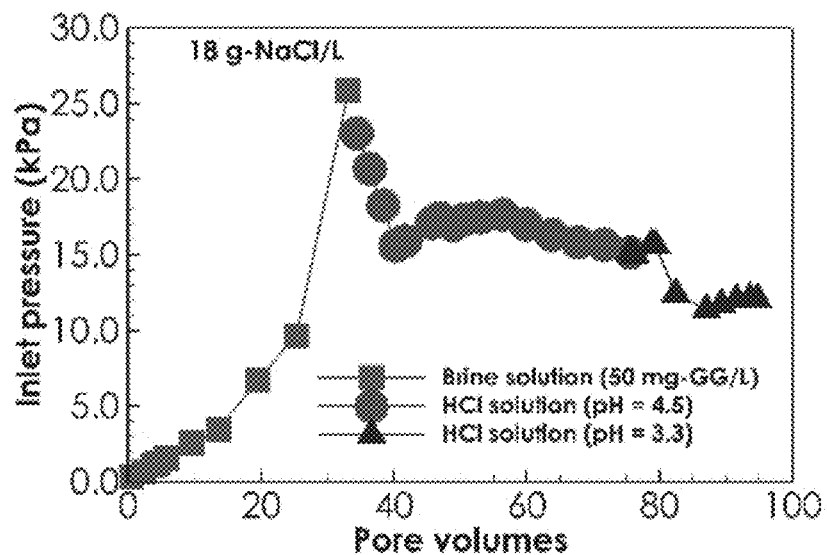

Powdered dolomite of uniform grain size is used to increase the surface area of dolomite and to prevent the formation of flow channels through the dolomite filter. Compaction and compression is used to prevent the suspension of dolomite grains by flotation and to allow for the trapping of polymers (guar gum) that work as a secondary filtration media for toxic metals in small pore throats of the dolomite filter. Higher levels of toxic metal removal is obtained with the addition than without the addition of polymers (guar gum). Higher levels of toxic metal removal is obtained with the addition than without the addition of polymers (guar gum, FIG. 4A). FIG. 4B shows the pressure buildup observed at the inlet of a dolomite filter due to the clogging of pore throats with guar gum along with the breakthrough curve of barium. An increase of barium removal levels reflected by an increase of the breakthrough time of barium is concomitant with a pressure buildup at the inlet of the dolomite filter. Immobilized guar gum in small pore throats of dolomite filters can work as a secondary filtration medium improving the removal of toxic metals from PW. Guar gum is one of the highest molecular weight polysaccharides with numerous hydroxyl groups for sorption reactions.

Figure 5:
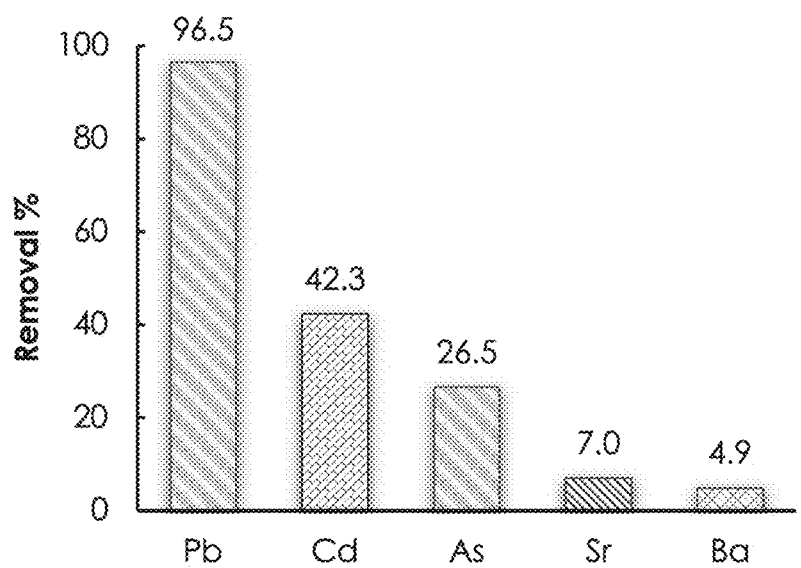
FIG. 5. Illustrates removal of 100 mg/L of lead (Pb), strontium (Sr), barium (Ba), arsenic (As), and cadmium (Cd) from 1 L of synthetic PW using a dolomite filter made of 350-600 μm grain size (1.5-inch diameter and 6-inch length). PW injection rate is 0.1 mL/min, and salinity of PW is 45,000 mg/L.
Figure 6:
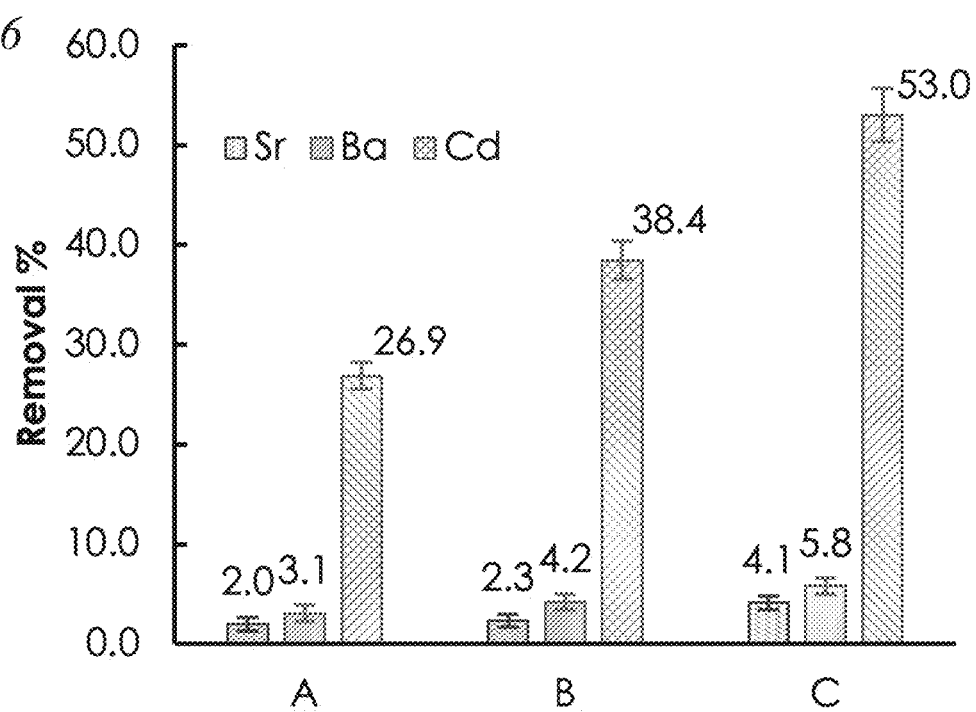
FIG. 6. contains a chart that illustrates removal of 100 mg/L of strontium (Sr), barium (Ba), and cadmium (Cd) from 1 L of synthetic PW at (A) 0.5 mL/min, (B) 0.25 mL/min, and (C) 0.1 mL/min injection rates using a dolomite filter made of 600-850 μm grain size (1.5-inch diameter and 6-inch length). Salinity of PW is 115,500 mg/L.

Calcium and magnesium whose concentrations are generally at least one order of magnitude higher than the concentrations of toxic metals in PW is removed through precipitation as carbonate salts in sedimentation tanks to reduce the competition between calcium and magnesium and toxic metals for hydration (sorption) sites of dolomite. Competition of cations for hydration sites of dolomite is a major factor affecting the efficiency of toxic metals removal by dolomite filtration. Moreover, Dolomite is more effective at removing heavy metals (e.g., lead) than metalloids (e.g., arsenic) and alkaline earth metals (e.g., barium and strontium) (see FIG. 5), and that complete removal of these toxic metals can be achieved by reducing the injection rate of PW into the dolomite filter and/or increasing the size of the dolomite filter (see FIG. 6).

Comparison to Other Known Solutions.

Stimulation of crude oil biodegradation has been studied before mostly in the realm of enhanced oil recovery. Investigated stimulation methods include the combined supply of carbohydrates (e.g., molasses, glucose) and yeast Extract, see U.S. Patent 2013/0020073 A1. The present invention is superior to other stimulation methods due to the synergistic effect of combining the supply of protein-rich matter and carbon dioxide. Moreover, the present invention to stimulate the biodegradation of oil (mostly n-alkanes) is less expensive than other stimulation methods because isolated soy protein which is the most abundant and cheapest source of nitrogen, phosphorus, and trace metals is used as substitute for yeast extract which constitutes the most expensive source nitrogen, phosphorus, and trace metals in the world.

The utilization of dolomite has been suggested before as an alternative to treat conventional wastewater for toxic metals. However, previously proposed treatment methods consist of using powdered dolomite as sorption media in batch reactors to treat conventional wastewater containing traces concentration of toxic metals (<0.1 mg/L), not petroleum PW containing high concentrations of toxic metals (>1 mg/L). Most solutions to remove oil, salinity (mostly NaCl), and toxic metals from PW relay on the use of expensive membrane filters whose service life is short due to fouling, mostly caused by the clogging of pores with large hydrocarbon molecules (e.g., n-alkanes), see for instance U.S. Patent 20200331777 A1. The present invention consists of using inexpensive filters made of compressed powdered dolomite whose fouling is attenuated by previously treating PW for dissolved and emulsified oil in a separate stage.

In general, different from other solutions, the proposed solution relies on the use of natural and inexpensive microbiological (indigenous methanogenic microbial comminutes), mineral (dolomite), and chemical (isolated soy protein, sodium bicarbonate, and polymers) resources. Coupled methanogenic biodegradation and dolomite filtration is a novel treatment method based on fundamental research conducted to elucidate the response of indigenous methanogenic microbial communities present in PW to the availability of protein-rich matter and carbon dioxide, and the transport of toxic metals in deep dolomite saline aquifers.

Previous studies have suggested the possibility of using powdered dolomite to remove toxic metals from conventional wastewater. However, those studies were conducted using a single type of toxic metal or mixture of toxic metals and metalloids at low salinity conditions. However, the instant approach uses dolomite filtration and guar gum to remove mixtures of toxic metals and metalloids from PW that is characterized by high salinity. Salinity (NaCl) has a significant negative impact on the removal of Sr and Ba, but not on Cd removal from PW. Sorption reactions of Sr, Ba, and Cd on dolomite are kinetically controlled reactions that are not limited by the availability of pore surface area, but by the retention time of PW in the dolomite filter. An increase of Sr, Ba, and Cd removal by increasing the number (length) of filters suggest that a complete removal of Sr, Ba, and Cd can be obtained by optimizing the relationship between the injection rate and size of the dolomite filter.

Further in connection with the instant invention, experimental results indicate that pretreating PW by combining methanogenic degradation of dissolved oil (n-alkanes) and dolomite filtration of toxic metals (e.g., Ba, Sr, and Cd) can enable the use of conventional water treatment technologies (e.g., membrane filtration) to remove remaining contaminants (e.g., NaCl, BTEX, PAHs) from PW at an economic cost. The technological novelty of the proposed pretreatment method is on (1) the use of anaerobic oil degrading microbial communities present in PW that are well adapted to high salinity conditions, and (2) the use of dolomites that represent a superior sorption capacity for toxic metals than other natural and inexpensive sorption materials (e.g., sandstone). The practical novelty of the proposed research is on (1) the feasibility of operating PW storage tanks as anaerobic bioreactors, and (2) the abundance and easy access to high purity dolomites in outcrops of the Arbuckle Group of Oklahoma and Kansas.

In this contribution, we introduce experimental results on (1) the stimulating effect of the combined supply of protein-rich matter and $CO_2$ on the methanogenic degradation of dissolved oil (n-alkanes) using PW collected from the Cushing and Stillwater oilfields, and (2) on the removal of barium from synthetic PW using compressed dolomite filters made of powdered dolomite collected from an outcrop in Kansas. Advantages and Disadvantages.

One advantage of the present invention is on the low cost of operation and maintenance of the anaerobic batch reactor and dolomite filter. PW storage tanks which are generally available in oil, gas, and PW separation plants can be readily adapted to operate as anaerobic reactors to treat PW for dissolved and emulsified oil by the present invention. High purity dolomite is abundant and readily available from outcrops of the midcontinent (e.g., Arbuckle Group), and the preparation of filters made of compressed powdered dolomite is much simpler than the preparation and/or construction of other types of filters.

One limitation of the present invention is that depending on the intended final use of PW, remaining concentrations of organic and inorganic contaminants present in PW need to be treated for in subsequent treatment stages, see for instance U.S. Pat. No. 7,767,078 B2 which includes desalination by reverse osmosis and aeration to enable the aerobic biodegradation of volatile organic compounds including BTEX, PAH, asphaltenes, and resins which are generally present at lower concentrations than n-alkanes in PW. The present invention is to treat PW for the two most abundant contaminants in PW (dissolved and emulsified oil (mostly n-alkanes) and toxic metals (heavy metals, metalloids, and alkaline earth metals)). This invention suppresses the fouling and degradation of expensive separation materials suitable to treat conventional wastewater containing orders of magnitude lower concentrations of dissolved and emulsified oil and toxic metals than PW. Other limitations can be overcome through computer simulations and optimization of operational conditions on a case-by-case basis.

The present invention is primarily focused on treating PW for its two most abundant contaminants, i.e., dissolved and emulsified oil (mostly n-alkanes) and toxic metals, which aims to suppress the fouling and degradation of expensive separation materials suitable to treat conventional wastewater of orders of magnitude lower concentrations of dissolved and emulsified oil and toxic metals than PW. Other limitation which can be overcome through computer simulations is the optimization of operational conditions on a case-by-case basis.

It should be noted and understood that the invention is described herein with a certain degree of particularity. However, the invention is not limited to the embodiment(s) set forth herein for purposes of exemplification but is limited only by the scope of the attached claims.

It is to be understood that the terms "including", "comprising", "consisting" and grammatical variants thereof do not preclude the addition of one or more components, features, steps, or integers or groups thereof and that the terms are to be construed as specifying components, features, steps or integers.

The singular shall include the plural and vice versa unless the context in which the term appears indicates otherwise.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of producing a treated produced water, comprising the steps of:
    (a) accessing a quantity of produced water (PW);
    (b) adding a protein material and a carbon dioxide source to the PW to produce a biodegraded PW;
    (c) inducing sedimentation by adding a lime and a soda ash to the biodegraded PW to produce a filterable PW;
    (d) adding guar gum to the filterable PW to create a filter-ready PW; and
    (e) using a dolomite filter to filter the filter-ready PW, thereby producing said treated produced water.

2. The method according to claim 1, wherein the carbon dioxide source is sodium bicarbonate.

3. The method according to claim 1, wherein the carbon dioxide source is $CO_2$ from an industrial source.

4. The method according to claim 1, wherein the protein matter is a soy protein.

5. The method according to claim 1, wherein step (b) comprises the steps of
    (b1) adding a protein material and a carbon dioxide source to the PW and adjusting the pH of the PW to between 4 and 5, to produce a biodegraded PW.

6. A method of producing a treated produced water, comprising the steps of:
    (a) accessing a quantity of produced water (PW);
    (b) adding a soy protein and sodium bicarbonate to the PW to produce a biodegraded PW;
    (c) adjusting a pH of the biodegraded PW to between 4 and 5;
    (d) inducing sedimentation by adding lime and soda ash to the pH adjusted biodegraded PW to produce a filterable PW;
    (e) adding guar gum to the filterable PW to create a filter-ready PW; and
    (f) filtering the filter-ready PW using a dolomite filter, thereby producing said treated produced water.

7. The method according to claim 6, wherein step (c) comprises the step of adjusting the pH of the biodegraded PW to between 4 and 5 using hydrochloric acid.

8. A method of producing a treated produced water, comprising the steps of:
    (a) adding a protein material and a carbon dioxide source to a quantity of produced water (PW), thereby producing an activated PW;
    (b) retaining the activated PW for a period of time, thereby producing a biodegraded PW;
    (c) adding lime and soda ash to the biodegraded PW to produce a filterable PW;
    (d) adding guar gum to the filterable PW; and
    (e) after adding guar gum to the filterable PW, using a dolomite filter to filter the filterable PW, thereby producing said treated produced water.

9. The method according to claim 8, wherein step (b) comprises the step of retaining the activated PW for between 1 and 2 weeks, thereby producing the biodegraded PW.

10. The method according to claim 9, wherein step (b) comprises the steps
    (b1) of adjusting the pH of the activated PW to between 4 and 5, and
    (b2) retaining the activated pH-adjusted PW for a period of time, thereby producing a biodegraded PW.

11. The method according to claim 10, wherein step (b1) comprises the step of adjusting the pH of the activated PW to between 4 and 5 using hydrochloric acid.

* * * * *